(12) United States Patent
Panganiban et al.

(10) Patent No.: US 9,533,712 B2
(45) Date of Patent: Jan. 3, 2017

(54) WHEEL CATCHER ASSEMBLY

(71) Applicant: GM GLOBAL TECHNOLOGY OPERATIONS LLC, Detroit, MI (US)

(72) Inventors: Ronald A. Panganiban, Chesterfield, MI (US); Wendy W. Malone, Troy, MI (US); Bhushan W. Dandekar, Rochester Hills, MI (US); Mark J. Koski, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 14/518,222

(22) Filed: Oct. 20, 2014

(65) Prior Publication Data
US 2016/0107699 A1    Apr. 21, 2016

(51) Int. Cl.
*B62D 21/15*    (2006.01)
*B62D 25/02*    (2006.01)
*B62D 25/16*    (2006.01)

(52) U.S. Cl.
CPC ............. *B62D 25/025* (2013.01); *B62D 25/16* (2013.01)

(58) Field of Classification Search
CPC .......... B60R 19/16; B60R 19/24; B60R 19/54; B62D 9/00; B62D 21/15; B62D 21/152; B62D 25/025; B62D 25/082
See application file for complete search history.

(56) References Cited

U.S. PATENT DOCUMENTS

| | | | | |
|---|---|---|---|---|
| 3,881,742 A | * | 5/1975 | Felzer | B60R 19/00 280/784 |
| 3,930,665 A | * | 1/1976 | Ikawa | B60R 21/045 180/90 |
| 4,221,413 A | * | 9/1980 | Bonnetain | B60R 19/18 188/377 |
| 4,573,724 A | * | 3/1986 | Campen | B60R 19/26 188/379 |
| 4,852,704 A | * | 8/1989 | Brockenbrough | B60J 5/0447 188/376 |
| 5,275,436 A | * | 1/1994 | Pomero | B60R 21/00 180/232 |
| 5,348,113 A | * | 9/1994 | Drvota | B62D 21/152 180/271 |
| 5,700,545 A | * | 12/1997 | Audi | B60N 2/4214 188/377 |

(Continued)

FOREIGN PATENT DOCUMENTS

| | | | | |
|---|---|---|---|---|
| DE | EP 0978442 A1 | * | 2/2000 | ............. B60R 19/00 |
| DE | WO 2013087139 A1 | * | 6/2013 | ............. B60R 19/00 |

(Continued)

*Primary Examiner* — Glenn Dayoan
*Assistant Examiner* — Paul Chenevert
(74) *Attorney, Agent, or Firm* — Quinn Law Group

(57) ABSTRACT

A wheel catcher assembly can inhibit a wheel from moving toward a passenger compartment of a vehicle when an external force is applied to the vehicle. The wheel catcher assembly generally includes an energy absorbing bracket and a plate coupled to the energy absorbing bracket. The energy absorbing bracket includes a plurality of ridges and grooves so as to define a waveform portion. The plate is coupled to the energy absorbing bracket at the ridges such that an external force applied to the wheel catcher assembly is transferable from the plate to the energy absorbing bracket.

13 Claims, 4 Drawing Sheets

(56) References Cited

U.S. PATENT DOCUMENTS

| | | | | |
|---|---|---|---|---|
| 5,884,962 A * | 3/1999 | Mattingly | ............... | B60R 21/04 280/751 |
| 6,196,621 B1 * | 3/2001 | VanAssche | ............ | B62D 21/15 296/187.09 |
| 6,237,990 B1 * | 5/2001 | Barbier | ................ | B62D 25/082 296/187.09 |
| 6,286,867 B1 * | 9/2001 | Braemig | ................ | B60R 19/00 280/762 |
| 6,364,358 B1 * | 4/2002 | Miller | .................... | B62D 25/04 280/784 |
| 6,547,318 B2 * | 4/2003 | Takeuchi | ............. | B62D 25/082 296/193.01 |
| 6,631,942 B1 * | 10/2003 | Kitagawa | ............ | B62D 21/152 296/187.1 |
| 6,712,411 B2 * | 3/2004 | Gotanda | ................ | B60R 19/24 293/132 |
| 6,854,553 B2 * | 2/2005 | Sovoda | .................... | B60R 19/00 180/274 |
| 6,866,115 B2 * | 3/2005 | Miyasaka | ............... | B60R 19/00 180/311 |
| 7,118,170 B2 * | 10/2006 | Montanvert | ......... | B62D 21/157 296/209 |
| 7,422,252 B2 * | 9/2008 | Gouillart | ................ | B60R 19/18 293/102 |
| 7,594,691 B2 * | 9/2009 | Koormann | ........... | B62D 25/025 296/187.12 |
| 7,900,995 B2 * | 3/2011 | Sato | ..................... | B62D 21/152 280/784 |
| 7,963,019 B2 * | 6/2011 | Reed | .................... | B62D 25/04 29/525.14 |
| 8,353,380 B2 * | 1/2013 | Schonberger | ........... | B60R 19/16 180/274 |
| 8,469,442 B1 * | 6/2013 | Pencak | .................. | B62D 25/14 296/187.12 |
| 8,540,224 B2 * | 9/2013 | Guthrie | ................. | B60G 11/00 267/164 |
| 8,613,461 B2 * | 12/2013 | Young | .................. | B62D 21/155 280/124.109 |
| 8,844,988 B1 * | 9/2014 | Albeez | .................... | B60R 19/02 293/133 |
| 9,126,629 B2 * | 9/2015 | Gilbert | .................... | B62D 21/00 |
| 9,187,133 B2 * | 11/2015 | Rangaswamaiah | .... | B62D 25/04 |
| 9,233,716 B2 * | 1/2016 | Midoun | ................ | B62D 21/155 |
| 2001/0020797 A1* | 9/2001 | Saeki | ..................... | B62D 21/15 296/203.03 |
| 2009/0065277 A1* | 3/2009 | Wang | .................. | B62D 25/105 180/69.2 |
| 2011/0146598 A1* | 6/2011 | Conner | ................. | F22B 37/205 122/510 |
| 2013/0161932 A1* | 6/2013 | Murray | .................. | B62D 21/15 280/784 |
| 2014/0225396 A1* | 8/2014 | Mochizuki | ......... | B62D 25/2018 296/187.09 |
| 2014/0375081 A1* | 12/2014 | Kuriyama | ............. | B62D 25/16 296/187.1 |
| 2015/0084322 A1* | 3/2015 | Killian | ................. | B60B 21/026 280/784 |
| 2015/0246697 A1* | 9/2015 | Kishima | ................ | B62D 25/16 296/180.1 |
| 2015/0321700 A1* | 11/2015 | Onoda | ................... | B62D 27/02 296/187.09 |

FOREIGN PATENT DOCUMENTS

| | | | | |
|---|---|---|---|---|
| DE | 102012004682 A1 * | 9/2013 | ........... | B62D 21/152 |
| DE | 102012004683 A1 * | 9/2013 | ........... | B62D 21/152 |
| DE | 102012024636 A1 * | 6/2014 | ............ | B60R 21/34 |
| DE | 102012025335 A1 * | 6/2014 | ............ | B62D 21/15 |
| DE | 102013214772 A1 * | 1/2015 | ............ | B62D 21/15 |
| FR | 842029 A * | 6/1939 | ............ | B60R 19/16 |
| FR | 2897813 A1 * | 8/2007 | ............ | B60R 19/00 |
| JP | DE 4302240 A1 * | 8/1993 | ............ | B60R 19/00 |
| JP | WO 2014109128 A1 * | 7/2014 | ............ | B60R 19/18 |

\* cited by examiner

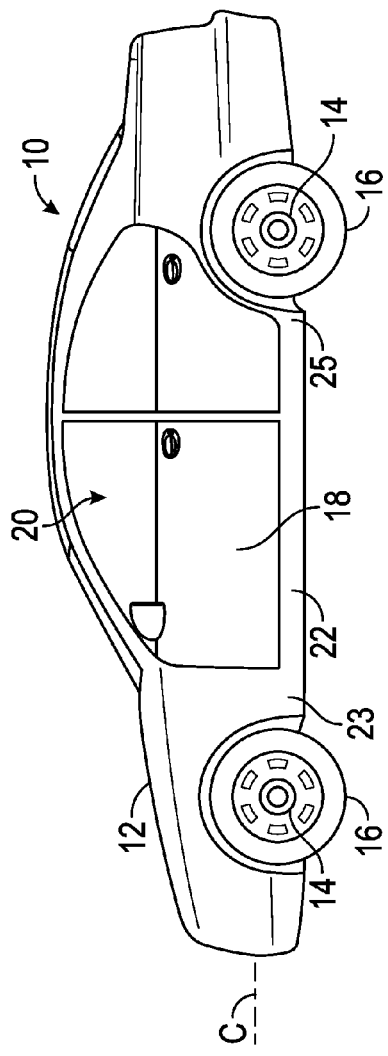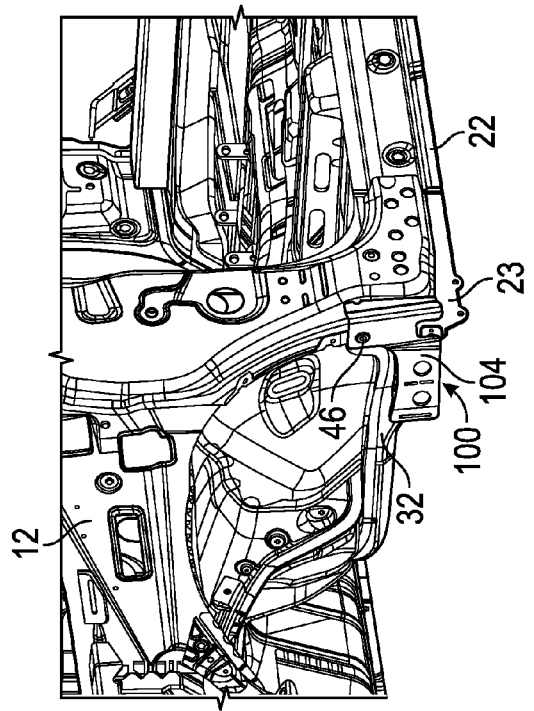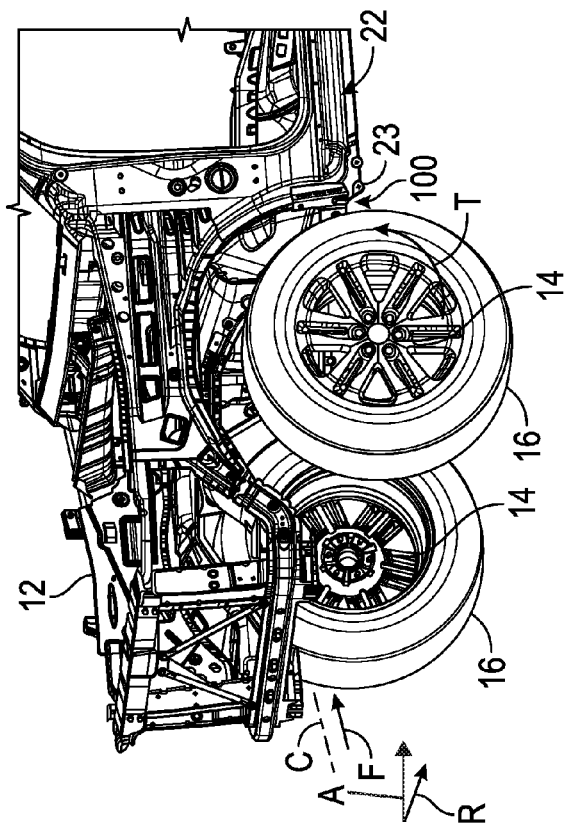
FIG. 1
FIG. 3
FIG. 2

WHEEL CATCHER ASSEMBLY

TECHNICAL FIELD

The present disclosure relates to a Wheel Catcher Assembly (hereafter referred to as WCA) for inhibiting the tire from moving and rotating toward the passenger compartment of a vehicle when the vehicle is subjected to an external, frontal force.

BACKGROUND

Many vehicles currently include energy absorption devices. These energy absorption devices can absorb and manage external forces applied to the vehicle. To do so, some energy absorption devices include deformable metallic components that are configured to deform when subjected to an external force.

SUMMARY

The WCA can prevent the tire from moving and rotating toward a passenger compartment of a vehicle when an external force is applied to the vehicle. The WCA includes an energy absorbing bracket and a plate. The energy absorbing bracket includes multiple ridges and grooves so as to define a waveform feature. The plate is coupled to the energy absorbing bracket at the ridges such that an external force applied to the WCA can be transferred from the plate to the energy absorbing bracket thus mitigating the load to the body structure. The present disclosure also relates to a vehicle including the WCA. In the vehicle, the WCA is indirectly coupled to the rocker panel via a gusset and underbody sill such that an external force applied to the vehicle can be transferred from the WCA to the rocker panel.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic side view of a vehicle;

FIG. 2 is a schematic fragmentary, perspective view of the vehicle shown in FIG. 1, including a WCA coupled to the vehicle body;

FIG. 3 is a schematic fragmentary, perspective view of the WCA coupled to a gusset and underbody sill of the vehicle shown in FIG. 1;

DETAILED DESCRIPTION

Figure 4:
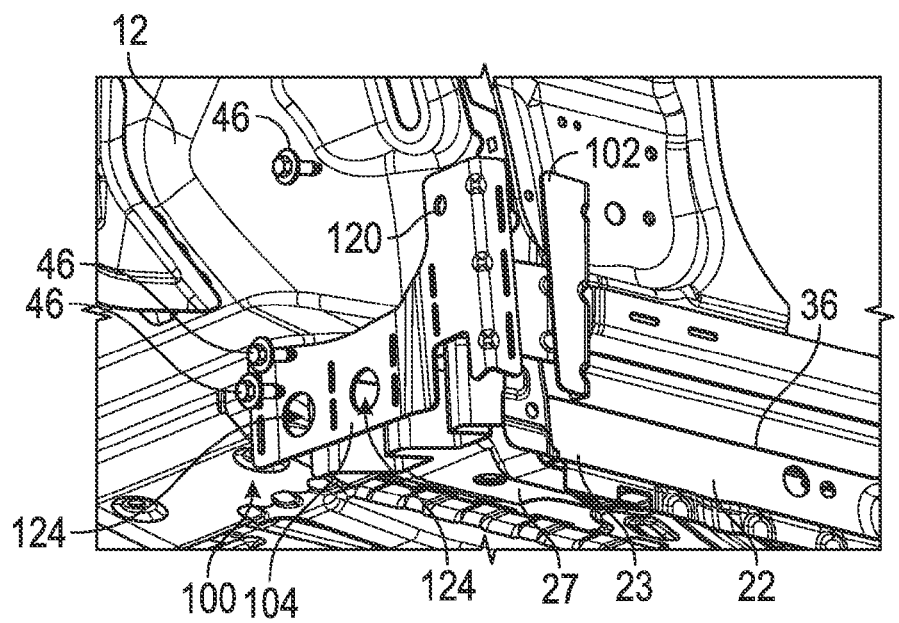
FIG. 4 is a schematic, perspective, exploded view of the WCA shown in FIG. 2 and the rocker panel shown in FIG. 3.

Referring to the drawings, wherein like reference numbers correspond to like or similar components throughout the several figures. FIGS. 1 and 2 generally show a vehicle (10) including a vehicle body (12), which extends along a central longitudinal axis C. The vehicle (10) may be a car, a truck, a van, or any other suitable automotive or non-automotive vehicle and includes a plurality of wheels (14) coupled to the vehicle body (12). Each wheel (14) is coupled to a tire (16). When the vehicle (10) is driven, the wheels (14) rotate relative to the vehicle body (12) in order to propel the vehicle (10).

With reference to FIG. 1, the vehicle (10) further includes at least one door (18) movably coupled to the vehicle body (12). The door (18) can move relative to the vehicle body (12) between a closed position and an open position. In the open position, the door (18) provides access to a passenger compartment (20) of the vehicle (10). The vehicle body (12) defines the passenger compartment (20), which is configured and sized to accommodate at least one driver and/or passenger.

With reference to FIG. 1, the vehicle body (12) includes at least one rocker panel (22) underneath each door (18). In the depicted embodiment, one rocker panel (22) is disposed underneath two doors (18) on each side of the vehicle (10). The rocker panel (22) helps support at least one door (18) and includes a first or frontal end portion (23) and a second or rear end portion (25) opposite the frontal end portion (23).

With reference to FIGS. 1, 2, and 3, the vehicle (10) further includes a WCA (100) configured to hinder the movement of at least one of the wheel (14) and tire (16) toward the passenger compartment (20) when an external, frontal offset force F is applied to the vehicle (10). The term "external frontal offset force" means a force applied to the front of the vehicle (10), wherein the force is offset from the central longitudinal axis (C) defined along the vehicle body (12). The central longitudinal axis (C) extends along the vehicle body in the fore/aft direction (A). External, frontal offset force (F) is spaced from the central longitudinal axis (C) in a cross-car direction (R). The cross-car direction (R) is perpendicular to the fore/aft direction (A). When the vehicle (10) is subjected to the external, frontal, offset force (F) the WCA (100) can prevent, or at least hinder one of the wheels (14) (along with the corresponding tire (16)) from being displaced toward the passenger compartment (20). In the depicted embodiment, the vehicle (10) includes a WCA (100) coupled to the vehicle body (12) behind the wheels (14) (which in this case are the front wheels).

With reference to FIG. 3, in the depicted embodiment, the WCA (100) is coupled to the frontal end portion (23) of the rocker panel (22). The WCA (100) is coupled to the rocker panel (22) through a gusset (27) and underbody cross sill (32) of the vehicle body (12), as discussed in detail below.

Figure 5:
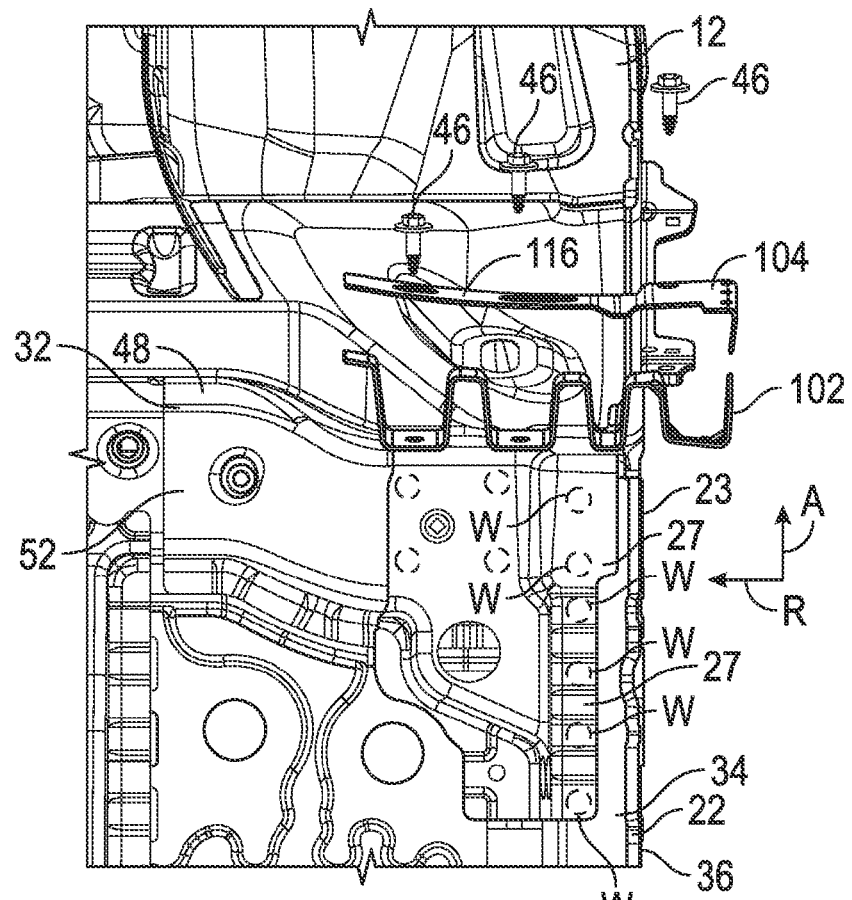
FIG. 5 is a schematic, bottom, exploded view of the WCA shown in FIG. 4, as well as, the rocker panel, the gusset, and the sill of the vehicle shown in FIG. 3.
Figure 6:
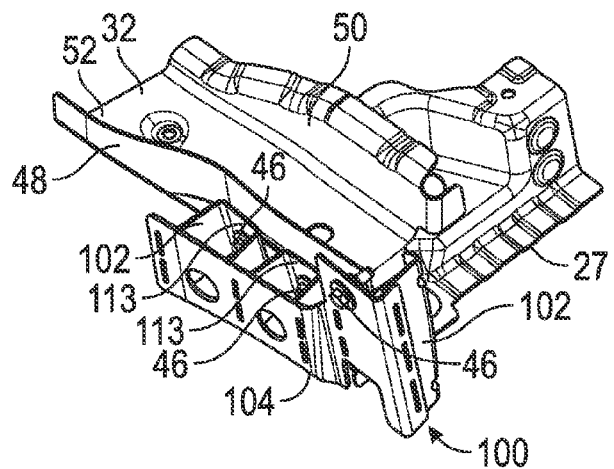
FIG. 6 is a schematic, perspective view of the WCA shown in FIG. 4 coupled to the gusset and the sill shown in FIG. 5.

With reference to FIGS. 4-6, the gusset (27) is directly coupled to the front end portion (23) of the rocker panel (22) and can be configured as a bracket and serves to strengthen the front end portion (23) of the rocker panel (22). As a non-limiting example, the gusset (27) can be welded to the underside of the rocker panel (22) at weld spots (W). Specifically, the gusset (27) is welded to the bottom rocker floor (34) of the rocker panel (22). The bottom rocker floor

(34) is relatively perpendicular to a rocker side wall (36). Additionally, the gusset (27) can be coupled to the rocker panel (22) using any suitable fastener or adhesives. Regardless of how the gusset (27) is coupled to the rocker panel (22), the gusset (27) is directly coupled to the sill (32) and can be referred to as the underbody cross sill (32) because it extends along the vehicle (10) in a cross-car direction (R). The cross-car direction (R) extends from one side of the vehicle (10) to the opposite side of the vehicle (10). The fore-aft direction, A, is perpendicular to the cross-car direction, R, and extends from the front of the vehicle (10) to the rear of the vehicle (10). The rocker panel (22) and the gusset (27) extend in the fore-aft direction A and both may be deemed part of the wheel catcher assembly (100).

Figure 7:
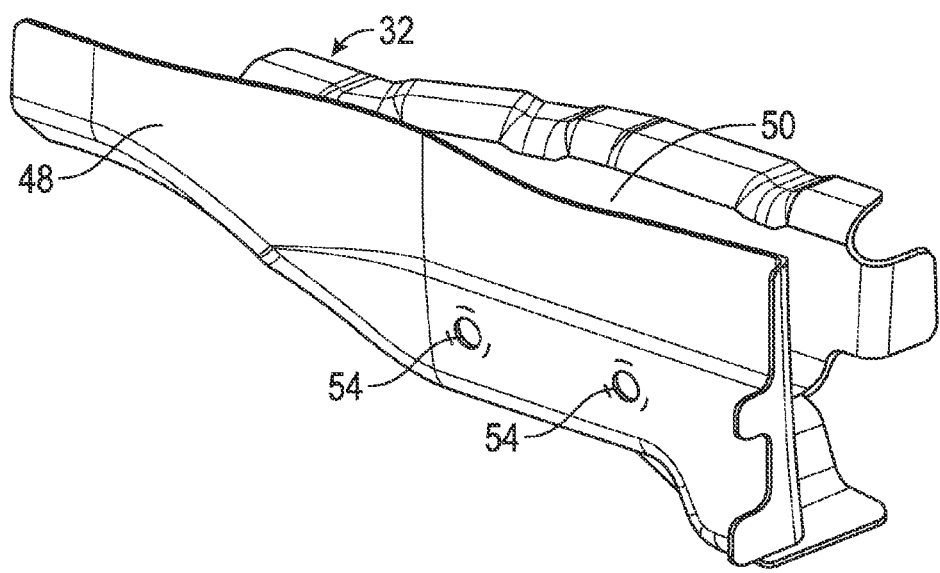
FIG. 7 is a schematic, perspective view of the underbody cross sill shown in FIG. 6.

With reference to FIGS. 6 and 7, the underbody cross sill (32) includes first sill sidewall (48), a second sill sidewall (50), and a sill base floor (52). The sill base floor (52) is relatively perpendicular to the first sill sidewall (48) and the second sill sidewall (50). The underbody cross sill (32) defines at least one sill hole (54). Each sill hole (54) is configured, shaped, and sized to receive a fastener (46), such as a bolt, in order to couple the underbody sill (32) to the vehicle body (12) or the gusset (27). The fastener (46) may include a torque prevailing patch, such as a polyamide bioplastic patch, in order to retain clamp load of the joint.

Figure 8:
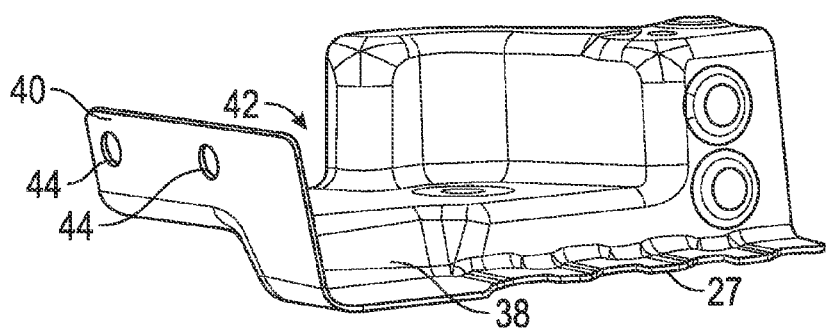
FIG. 8 is a schematic, perspective view of the gusset shown in FIG. 6.
Figure 10:
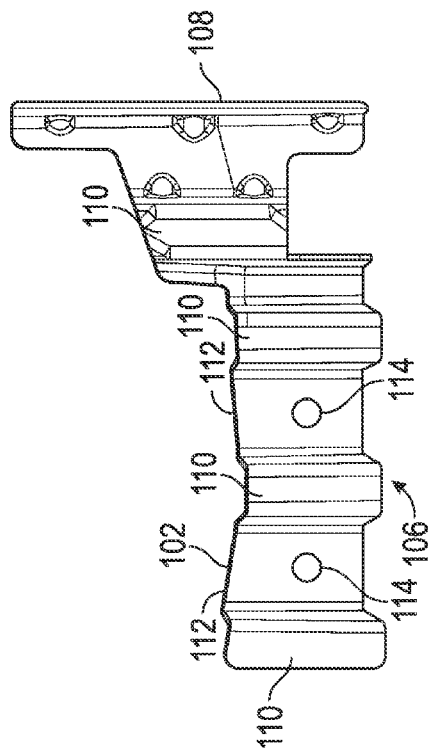
FIG. 10 is a schematic, front view of the energy absorbing bracket of the WCA shown in FIG. 6.

With reference to FIG. 8, the gusset (27) includes a main gusset body (38) and a gusset flange (40) extending relatively perpendicular from the main gusset body (38). The main gusset body (38) and the gusset flange (40) collectively define a gusset recess (42) configured, shaped, and sized to receive the underbody cross sill (32). When the WCA (100) is coupled to the gusset (27), the gusset flange (40) is disposed between the WCA (100) and the underbody cross sill (32). As a non-limiting example, the gusset (27) defines a plurality of gusset holes (44) extending through the gusset flange (40). Each gusset hole (44) is configured, shaped, and sized to receive a fastener (46), such as a bolt, in order to couple the WCA (100) to the gusset (27) and the underbody cross sill (32) via the gusset flange (40). The fasteners (46) can extend through the WCA (100), the gusset flange (40), and the first sill sidewall (48), in order to couple the WCA (100) to the gusset (27), and the underbody cross sill (32).

With reference to FIGS. 1, 2, 4, 5, and 6, the WCA (100) is configured to absorb and manage kinetic energy stemming from the frontal offset force (F) in order to inhibit or prevent the wheel (14) and tire (16) from moving in an inboard direction (T) toward the passenger compartment (20). In particular, the WCA (100) is coupled to the vehicle body (12), behind the wheel (14) and the tire (16) in order to minimize the displacement of the wheel (14) and the tire (16) toward the passenger compartment (20) when the vehicle (10) is subjected to the frontal offset force (F) that is offset from the central longitudinal axis (C) defined along the center of the vehicle body (12).

With reference to FIGS. 9 through 12, in the depicted embodiment, the WCA (100) includes an energy absorbing bracket (102) and plate (104). The energy absorbing bracket (102) is coupled between the gusset (27), gusset flange (40), and the plate (104). Fasteners (46), such as bolts, can be inserted through the energy absorbing bracket (102), the gusset flange (40), and the first sill sidewall (48) in order to couple the WCA (100) to gusset (27) and the underbody cross sill (32). The gusset (27) couples the WCA (100) to the rocker panel (22).

The energy absorbing bracket (102) is made of a substantially rigid material and includes a waveform portion (106) and a bracket flange (108) extending from the waveform portion (106). The bracket flange (108) can be directly coupled to the plate (104) (see FIG. 6). For instance, a fastener (46), such as a bolt, can be inserted through the plate (104) and the bracket flange (108) in order to couple the plate (104) to the energy absorbing bracket (102). Likewise, the plate (104) can be coupled to the bracket flange (108) via any weld strategy.

The waveform portion (106) of the energy absorbing bracket (102) may also be referred to as a corrugated portion and includes a plurality of ridges (110) and grooves (112) such that the energy absorbing bracket (102) defines a waveform shape. The ridges (110) may also be referred to as hills and the grooves (112) may be referred to as valleys. In the depicted embodiment, the waveform portion (106) includes four ridges (110) and four grooves (112). However, it is contemplated that the waveform portion (106) may include more or fewer ridges (110) and grooves (112). The waveform shape of the energy absorbing bracket (102) allows it to absorb external forces. For example, when the frontal offset force (F) is applied to the vehicle (10) and the wheel (14) and tire (16) exert a force on the WCA (100), the waveform portion (106) may deform in order to absorb at least some of the force exerted by the wheel (14) and tire (16), thereby preventing the wheel (14) and tire (16) from moving toward the passenger compartment (20). The ridges (110) and grooves (112) may have different shapes and sizes. That is, not all the ridges (110) and grooves (112) have the same shape or size. It is envisioned, however, that all the ridges (110) and grooves (112) may have the same shape and size. Each groove (112) may be defined by a U-shaped wall (113). Accordingly, the waveform portion (106) of the energy absorbing bracket (102) includes a plurality of U-shaped walls (113).

The energy absorbing bracket (102) defines a plurality of bracket holes (114) each configured, shaped, and sized to receive a fastener (46). The fastener (46) can be inserted through the bracket holes (114), the gusset flange (40), and the first sill sidewall (48) in order to couple the WCA (100) to the underbody cross sill (32) and the gusset (27). Because the gusset (27) is coupled to the rocker panel (22), the energy absorbing bracket (102) is indirectly coupled to the rocker panel (22). The energy absorbing bracket (102) can be directly coupled to the plate (104).

Figure 12:
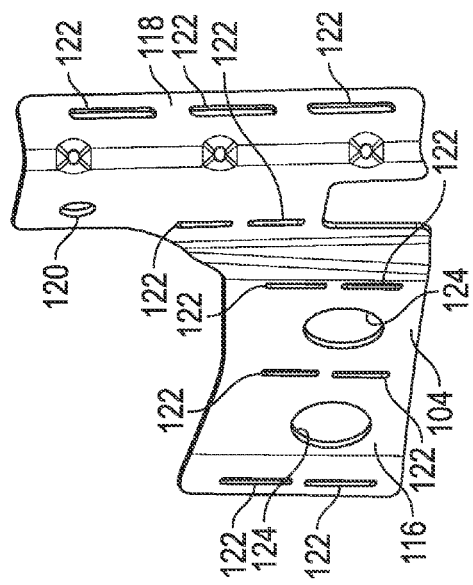
FIG. 12 is a schematic, perspective view of the plate of the WCA shown in FIG. 6.
Figure 9:
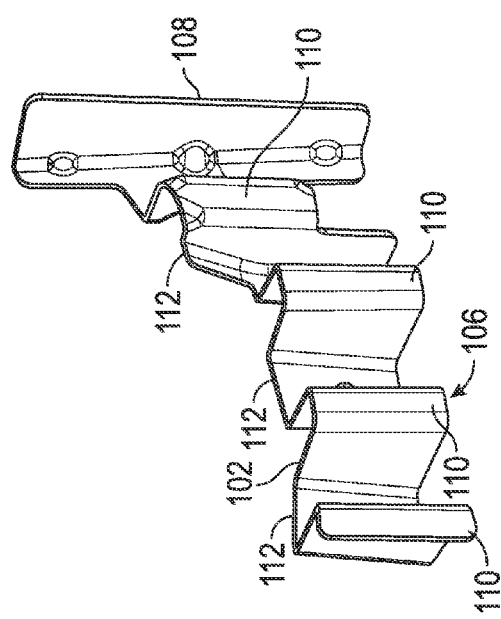
FIG. 9 is a schematic, perspective view of an energy absorbing bracket of the WCA shown in FIG. 6.
Figure 11:
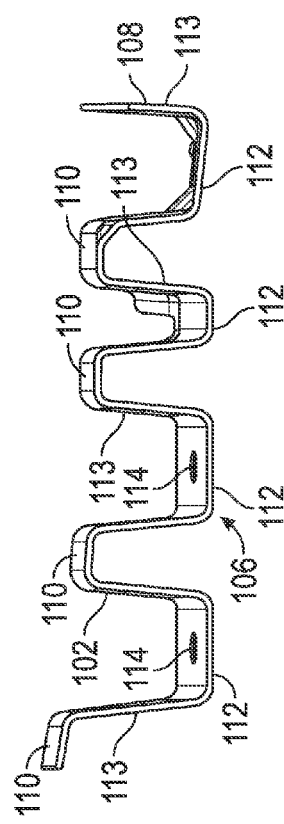
FIG. 11 is a schematic, perspective bottom view of the energy absorbing bracket of the WCA shown in FIG. 6.

With reference to FIG. 12, the plate (104) is configured to receive a force from the wheel (14) and tire (16) and transfer this force to the energy absorbing bracket (102). In the depicted embodiment, the plate (104) is partly or wholly made of a substantially rigid material, such as a rigid metal, includes a slightly curved portion (116) and a plate flange (118) extending from the slightly curved portion (116). The slightly curved portion (116) has a shape in order to receive external forces applied by the wheel 14 and/or the tire 16. The plate flange (118) can be directly coupled to the bracket flange (108) in order to couple the energy absorbing bracket (102) to the plate (104). The plate flange (118) can be bolted or welded to the bracket flange (108). The plate (104) defines a flange hole (120) for receiving the fastener (46) and coupling the WCA (100) to vehicle body (12). In addition to the flange hole (120), the plate (104) may define a plurality of slots (122) to facilitate welding the plate (104) to the energy absorbing bracket (102). Accordingly, the energy absorbing bracket (102) can be welded to the plate (104) using, for example, mig welds. The plate (104) is coupled (e.g., welded) to the energy absorbing bracket (102) at the ridges (110) of the waveform portion (106). The plate (104) further defines a plurality of access holes (124) for accessing the fasteners 46 that couple the energy absorbing bracket (102) to the underbody cross sill (32) by way of the gusset (27).

With reference to FIGS. 2 through 5, when the front offset force (F) is applied to the vehicle (10), the wheel (14) and the tire (16) may tend to rotate in an inboard direction T toward the passenger compartment (20). However, before the wheel (14) and tire (16) can move into the passenger compartment 20, the wheel catcher assembly (100) absorbs part of the kinetic energy stemming from the front offset force F and prevents, or at least inhibits, further displacement of the wheel (14) and tire (16) in the inboard direction T toward the passenger compartment (20).

While the best modes for carrying out the teachings have been described in detail, those familiar with the art to which this disclosure relates will recognize various alternative designs and embodiments for practicing the teachings within the scope of the appended claims.

The invention claimed is:

1. A vehicle, comprising
  a vehicle body including a rocker panel;
  a wheel catcher assembly coupled to the rocker panel, wherein the wheel catcher assembly includes:
    an energy absorbing bracket coupled to the rocker panel, wherein the energy absorbing bracket includes a plurality of ridges and grooves so as to define a waveform portion; and
    a plate coupled to the energy absorbing bracket at the ridges; and
    wherein the wheel catcher assembly is coupled to the rocker panel such that an external force applied to the vehicle is transferable from the plate to the rocker panel via the energy absorbing bracket;
  a gusset directly coupled to the rocker panel, wherein the gusset is coupled between the rocker panel and the energy absorbing bracket, the gusset includes a main gusset body and a gusset flange extending perpendicularly from the main gusset body, and the energy absorbing bracket is directly coupled to the gusset flange; and
  a sill coupled to the energy absorbing bracket, wherein the gusset defines a gusset recess partly receiving the sill.

2. The vehicle of claim 1, wherein the vehicle includes a wheel coupled to the vehicle body, the vehicle body defines a passenger compartment, and the wheel catcher assembly inhibits the wheel from moving toward the passenger compartment when the external force is applied to the vehicle.

3. The vehicle of claim 1, wherein the rocker panel includes a first end portion and a second end portion opposite the first end portion, and the wheel catcher assembly is coupled to the first end portion of the rocker panel.

4. The vehicle of claim 1, wherein the energy absorbing bracket includes a bracket flange extending from the waveform portion, the plate includes a slightly curved portion and a plate flange extending from the slightly curved portion, and the bracket flange is directly coupled to the plate flange.

5. The vehicle of claim 1, wherein the gusset is coupled to the energy absorbing bracket such that the external force applied to the vehicle is transferable from the plate to the gusset and the sill via the energy absorbing bracket.

6. The vehicle of claim 5, wherein the gusset flange is disposed between the sill and the energy absorbing bracket.

7. The vehicle of claim 6, wherein the rocker panel includes a rocker side wall and a bottom rocker floor coupled to the rocker side wall, the bottom rocker floor is perpendicular to the rocker side wall, and the gusset is welded to the bottom rocker floor.

8. The vehicle of claim 7, wherein the energy absorbing bracket includes a plurality of U-shaped walls, each of the U-shaped walls defines one of the grooves, and the gusset flange is directly coupled to the U-shaped walls.

9. The vehicle of claim 8, further comprising a plurality of fasteners extending through at least one of the U-shaped walls and the gusset flange in order to couple the energy absorbing bracket to the gusset.

10. A vehicle, comprising
  a rocker panel;
  a wheel catcher assembly coupled to the rocker panel, wherein the wheel catcher assembly includes:
    an energy absorbing bracket coupled to the rocker panel, wherein the energy absorbing bracket includes a plurality of ridges; and
    a plate coupled to the energy absorbing bracket;
  a gusset coupled to the rocker panel, wherein the gusset is coupled between the rocker panel and the energy absorbing bracket, the gusset includes a main gusset body and a gusset flange extending from the main gusset body, and the energy absorbing bracket is coupled to the gusset flange; and
  a sill coupled to the energy absorbing bracket, wherein the gusset defines a gusset recess partly receiving the sill.

11. The vehicle of claim 10, wherein the gusset flange is disposed between the sill and the energy absorbing bracket.

12. The vehicle of claim 10, wherein the rocker panel includes a rocker side wall and a bottom rocker floor coupled to the rocker side wall, the bottom rocker floor is perpendicular to the rocker side wall, and the gusset is welded to the bottom rocker floor.

13. The vehicle of claim 10, wherein the energy absorbing bracket includes a plurality of U-shaped walls.

* * * * *